United States Patent
Rehling et al.

(10) Patent No.: US 12,258,053 B2
(45) Date of Patent: Mar. 25, 2025

(54) RAIL CONVEYOR ELEMENT

(71) Applicant: Strothmann Machines & Handling GmbH, Schloss Holte-Stukenbrock (DE)

(72) Inventors: Stefan Rehling, Bückeburg (DE); Michael Bentrup, Steinhagen (DE); Markus Ostendorf, Paderborn (DE); Fabian Kuhlemann, Schlangen (DE); Tim Büllesbach, Werther (DE)

(73) Assignee: Strothmann Machines & Handling GmbH, Schloss Holte-Stukenbrock (DE)

( * ) Notice: Subject to any disclaimer, the term of this patent is extended or adjusted under 35 U.S.C. 154(b) by 767 days.

(21) Appl. No.: 17/533,406

(22) Filed: Nov. 23, 2021

(65) Prior Publication Data
US 2022/0178084 A1    Jun. 9, 2022

(30) Foreign Application Priority Data
Dec. 7, 2020 (DE) .......................... 102020132403.0

(51) Int. Cl.
| | |
|---|---|
| *B61K 5/02* | (2006.01) |
| *B61B 13/00* | (2006.01) |
| *B61L 5/02* | (2006.01) |
| *B65G 35/00* | (2006.01) |
| *E01B 7/18* | (2006.01) |
| *E01B 25/28* | (2006.01) |
| *B61L 23/00* | (2006.01) |

(52) U.S. Cl.
CPC ................ *B61K 5/02* (2013.01); *B61B 13/00* (2013.01); *B61L 5/02* (2013.01); *B65G 35/00* (2013.01); *E01B 7/18* (2013.01); *E01B 25/28* (2013.01); *B61L 23/002* (2013.01)

(58) Field of Classification Search
CPC ........... B61K 5/02; B61K 5/00; B61L 23/002; B61L 5/02; E01B 25/28; E01B 7/18; B61B 13/00; B65G 35/00
See application file for complete search history.

(56) References Cited

U.S. PATENT DOCUMENTS

| | | | | |
|---|---|---|---|---|
| 2,762,315 | A  * | 9/1956 | Talboys | B61K 5/00 |
| | | | | 105/215.1 |
| 3,918,366 | A  * | 11/1975 | Noah | B61K 5/02 |
| | | | | 114/77 R |
| 11,465,659 | B2 * | 10/2022 | Filippone | B61L 3/227 |

FOREIGN PATENT DOCUMENTS

| | | | | | |
|---|---|---|---|---|---|
| CN | 108382404 | A | * | 8/2018 | ............... B61B 3/00 |
| DE | 102017001349 | A1 | * | 8/2018 | |
| KR | 101404469 | B1 | * | 6/2014 | |

* cited by examiner

*Primary Examiner* — Zachary L Kuhfuss
*Assistant Examiner* — Cheng Lin
(74) *Attorney, Agent, or Firm* — Richard M. Goldberg

(57) ABSTRACT

Rail conveyor element which can be displaced on a rail system with intersecting rails, includes a base and a wheel-bearing cassette which supports the base and in which at least one wheel is accommodated to rest on a rail, the wheel-bearing cassette is rotatably mounted around a vertical axis relative to the base and the rail conveyor element includes a pressure ram with actuator which extends downward on or below the base and can be displaced between a raised unloaded position which coincides with the transport position of the rail conveyor and a lowered loaded position to unload the wheel-bearing cassette relative to the rail.

15 Claims, 5 Drawing Sheets

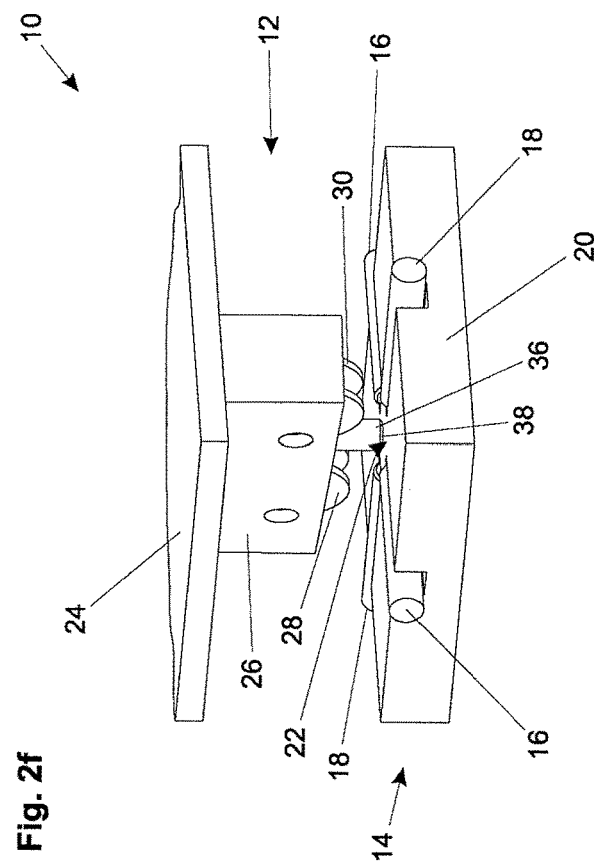
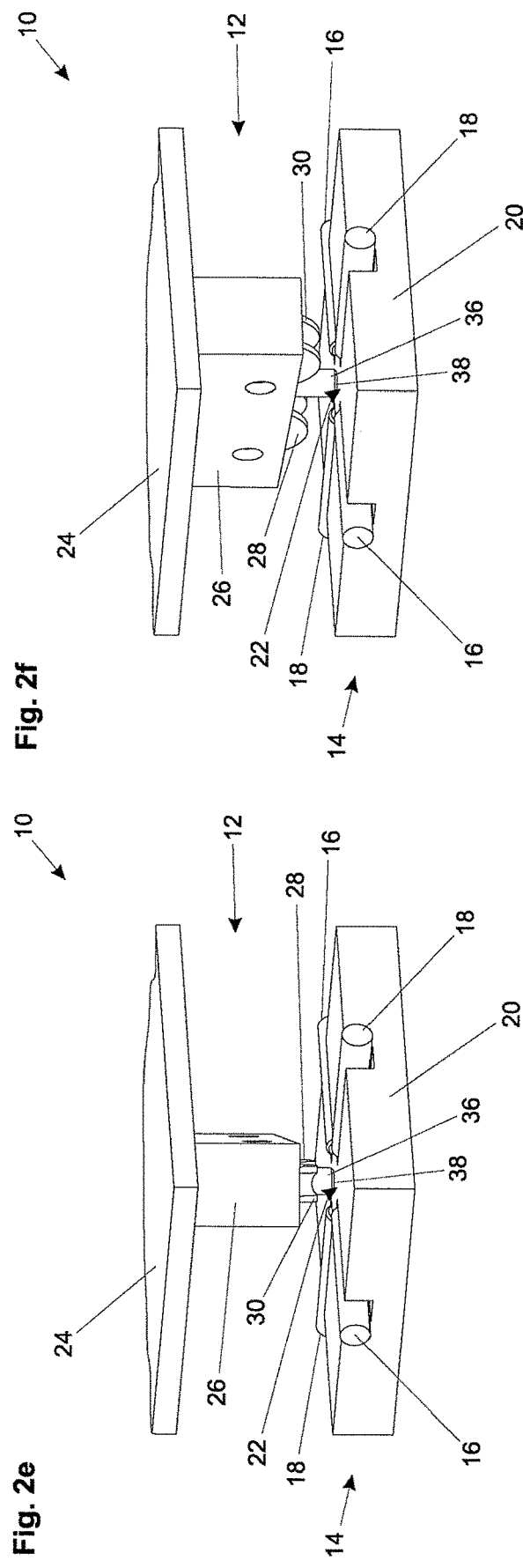
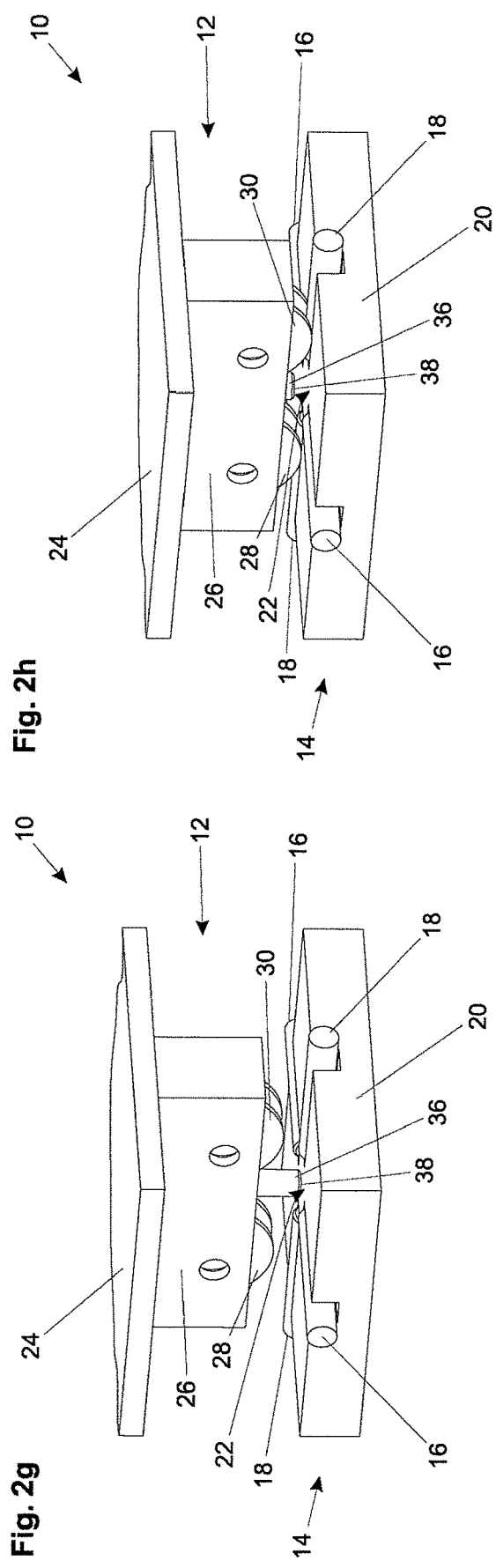
Fig. 2e  Fig. 2f  Fig. 2g  Fig. 2h

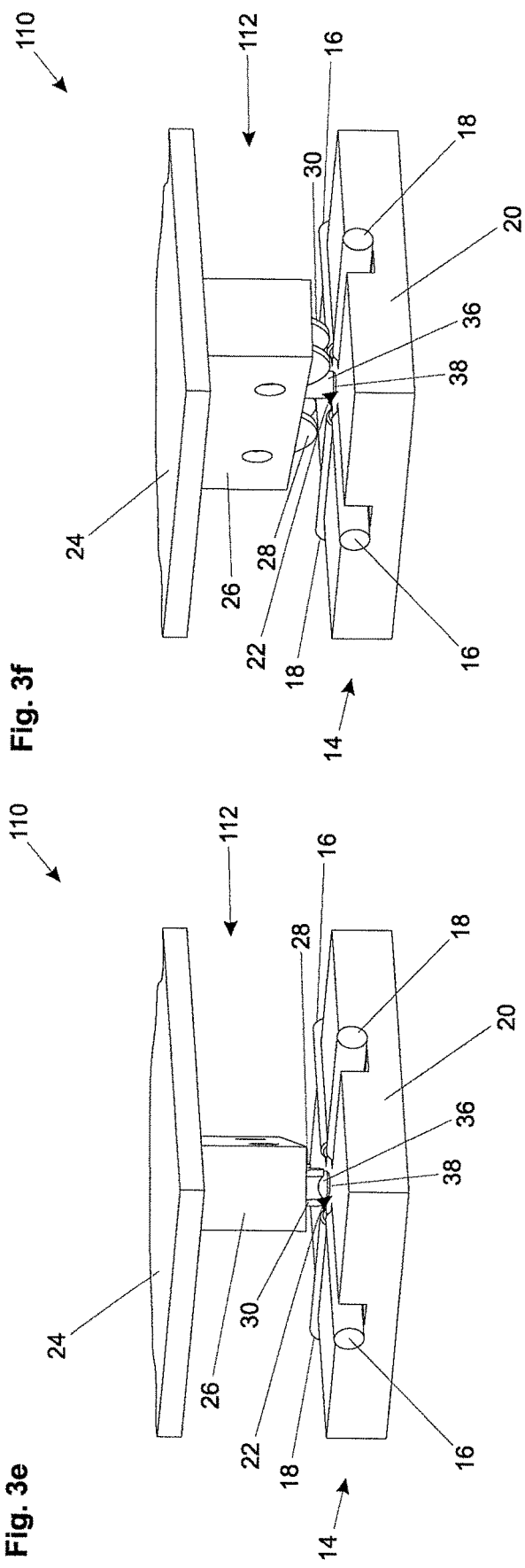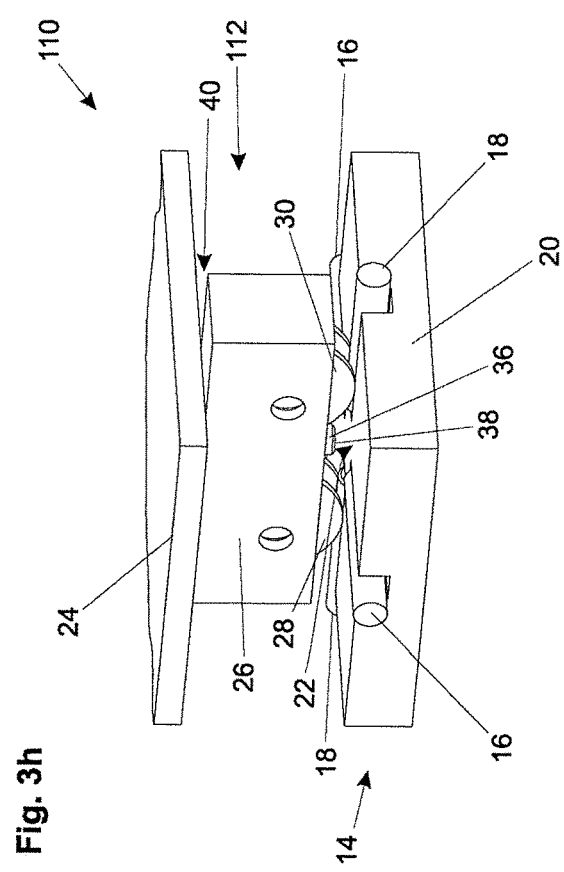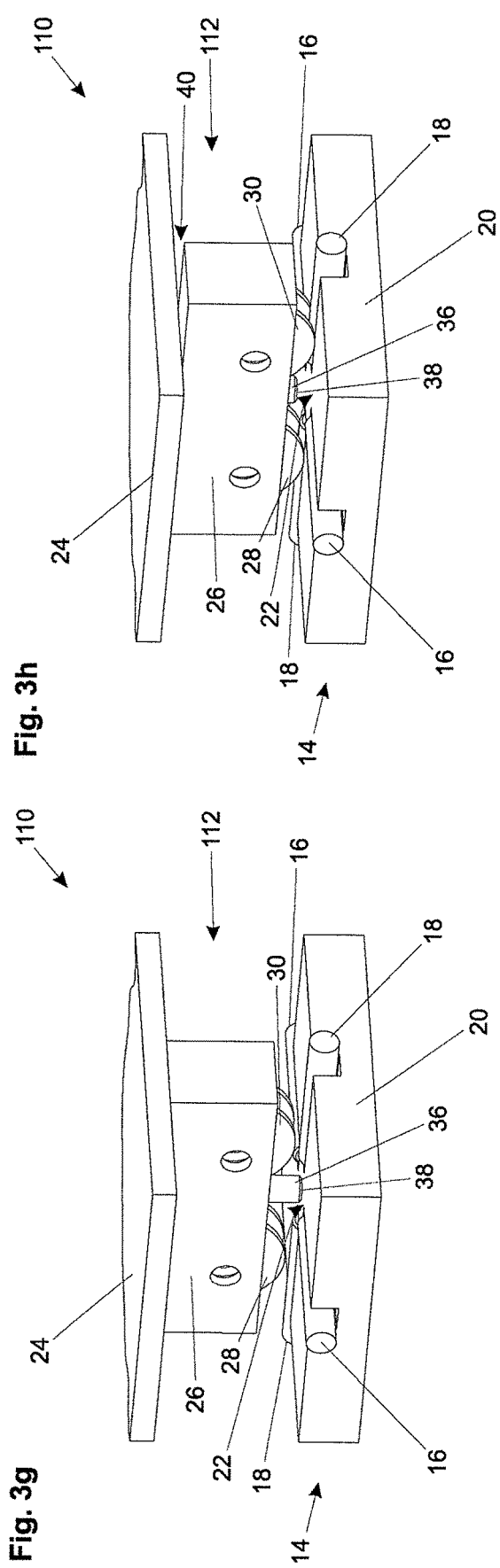

RAIL CONVEYOR ELEMENT

BACKGROUND OF THE INVENTION

The invention relates to a rail conveyor element, a rail conveyor comprising a plurality of such elements and a floor conveyor system comprising such a floor conveyor and a method of operating a rail conveyor element.

Rail conveyor systems are of great importance, particularly for transporting large and heavy workpieces. The rail conveyors in use are usually disposed on a system of intersecting rails so that the workpieces to be transported can be moved across small areas, e.g. in an assembly hall. The conveyors comprise a base on which the workpieces are transported and at least one wheel-bearing cassette disposed between base and rail system which rests the rail conveyor on the rail system. Changes of direction at rail intersections are technically complex and the prior art solutions are maintenance-intensive.

Prior art systems permit a change of direction of travel with the help of pivoting or rotating switches in the floor. Turntables allowing rotation of the entire floor conveyor on its section of rail from the first direction of travel to the second, to move along the following section of rail, by a single turntable, are technically complex and require high investment costs. Furthermore, it is not possible to maintain the orientation of the transported workpiece without further rotating elements in the floor conveyor to prevent the workpiece from rotating with it.

Document DE 10 2017 001 349 A1 discloses a rail intersection for a rail conveyor in which the wheels of a floor conveyor element are rotated individually or as subset, from a first direction of travel to a second, with the help of switch elements designated there as quadruple switches. Individual turntables are thus assigned to the wheels. Such an arrangement requires several technically complex turntables which must not only absorb the high loads which occur, but all turntables also have to rotate synchronously to ensure a chronologically effective sequence. In addition to a large manufacturing effort and associated costs, such an arrangement requires a great deal of space and maintenance when installed. Further, such a system offers no redundancies, so that failure of a single quadruple switch can bring an entire system to a standstill in case of doubt.

SUMMARY OF THE INVENTION

Hence it is a task of the present invention to provide a rail conveyor element to enable a change of direction of travel of the floor conveyor between intersecting rails without requiring a costly and maintenance-intensive rail system. Another task exists in the creation of a corresponding floor conveyor comprising a plurality of such elements, a floor conveyor system including appropriate rails, and methods for operating such a floor conveyor element.

These tasks are solved according to the invention by a rail conveyor element with the features of the claims, by a floor conveyor system according to the claims and by methods of operating a rail conveyor element according to the claims The invention comprises a rail conveyor element which can be moved on a rail system with intersecting rails and comprises a base and a wheel-bearing cassette attached to it, which, in a transport position of the rail conveyor element, supports the base and in which at least one wheel for resting on a rail is accommodated, with the wheel-bearing cassette being mounted such that it may be rotated around a vertical axis relative to the base and the rail conveyor element further comprising a pressure ram with actuator which, on or below the base, extends downward and, by means of the actuator, may be moved between a raised unloaded position corresponding to the transport position of the rail conveyor, and a lowered loaded position to unload the wheel-bearing cassette relative to the rail.

Such a rail conveyor element enables the wheel-bearing cassette to be unloaded in such a way that it can be rotated with little effort relative to the base of the rail conveyor element without requiring a complex construction of the rail system. The pressure ram acts against an area of the rail intersection and unloads the wheel-bearing cassette by exerting a counterpressure so that the latter no longer bears the load of the base and the workpiece to be transported. Instead, this load is now borne by the pressure ram. This allows all components required for a change of direction to be integrated in the floor conveyor element, thereby simplifying their control and the construction of the rail system. Furthermore, failure of one rail conveyor element can be remedied by simple, rapid exchange of the rail conveyor element without interrupting operation of the entire system. Besides considerably reducing the cost risk, that also allows a high degree of flexibility in the precise configurations of the rail conveyor elements and floor conveyors to be used.

According to a preferred embodiment of the invention, the pressure ram is designed, when in the loaded position, to raise the wheel-bearing cassette off the rail together with the base.

As a result of the wheel-bearing cassette and the base being lifted off the rail, the end of the pressure ram facing the rail projects downward beyond the running surface of the at least one wheel of the wheel-bearing cassette so that no part of the wheel-bearing cassette remains in contact with any part of the rail system. This allows the wheel-bearing cassette to be rotated freely and without resistance relative to the base.

According to a further preferred embodiment of the invention, the wheel-bearing cassette is, in the transport position, disposed at a vertical distance from the base and the rail conveyor element further comprises lifting means designed to lift the unloaded wheel-bearing cassette towards the base in the loaded position of the pressure ram.

With this embodiment, lifting of the load of the base and the transported workpiece can be avoided. It is sufficient to lower the pressure ram until it contacts the rail intersection and supports the base. The unloaded wheel-bearing cassette can then be lifted so that the running surfaces of the wheels are free and the wheel-bearing cassette itself can be rotated. With this embodiment, the pressure ram and its actuator can be weaker than would be the case for lifting the entire transport load.

According to another preferred embodiment of the invention, the wheel-bearing cassette accommodates at least two wheels between which the pressure ram is disposed.

The wheels are arranged one behind the other or side by side, for example, in the direction of travel.

According to a preferred embodiment of the invention the longitudinal axis of the pressure ram is identical to an axis of rotation of the wheel-bearing cassette.

This is particularly advantageous for an embodiment where the pressure ram rests exactly in the middle of the rail intersection. This ensures that the pressure ram and the wheel-bearing cassette are always disposed identically relative to the rail intersection point irrespective of the direction from which the floor conveyor enters the rail intersection. This simplifies the rotation of the wheel-bearing cassette, the steps necessary for this can be performed irrespective of the direction of entry and the wheel-bearing cassette performs an identical rotation relative to the rail intersection.

According to another preferred embodiment of the invention the rotation ram is arranged such that it cannot be rotated relative to the wheel-bearing cassette.

In this case, the rotation ram may form a fixed axis of rotation for the wheel-bearing cassette, but, to prevent unnecessary friction, is not rotated itself on its bearing point on the rail intersection when the wheel-bearing cassette is rotated.

According to a preferred embodiment of the invention, the actuator is disposed in the wheel-bearing cassette.

The actuator is, for example, a pneumatic system or hydraulic pump. Such an arrangement allows the wheel-bearing cassette, the pressure ram and the actuator to be designed as a combined unit and accordingly permit a fast, uncomplicated changeover of the entire unit in case of malfunctions.

According to another preferred embodiment, the actuator is disposed in or on the base.

Such an embodiment facilitates a smaller spatial dimensioning of the wheel-bearing cassette enabling a lower height of the rail conveyor element.

According to another preferred embodiment, the pressure ram incorporates at least one braking surface at its end which can be displaced towards the rail.

Such a braking surface allows the pressure ram to be displaced towards the rail in such a way, even during the movement of the rail conveyor element, that the braking surface builds up friction relative to the substrate, the rail for example, thereby braking the rail conveyor element. This enables the rail conveyor element to be designed without further braking elements whilst still retaining the braking functionality. The braking surface may be made of, for example, a wear-resistant material and/or a material with particularly good braking effect. Furthermore, the force exerted by the pressure ram on the rail or substrate by means of the braking surface can be adjusted.

The invention further comprises a rail conveyor comprising a plurality of rail conveyor elements having a common base and which are synchronised by synchronising devices to perform a common rotation of their wheel-bearing cassettes.

Depending on the application situation, such a rail conveyor may combine a plurality of identical rail conveyor elements in order to provide a suitable rail conveyor in a cost and construction-efficient manner. Such a rail conveyor thus comprises four rail conveyor elements for example, whose wheel-bearing cassettes are disposed at the corners of a rectangular base plate as a base. If such a rail conveyor travels along a pair of rails, its direction of travel can be changed to the direction of a second pair or rails by common synchronised rotation of the wheel-bearing cassettes.

According to another preferred embodiment of the invention, the majority of the rail conveyor elements are also synchronised to perform a common movement of their pressure rams.

The synchronisation of the pressure rams may be enabled for example by means of a joint actuator system or by means of a signal which synchronously controls the individual actuators.

The invention further comprises a floor conveyor system made up of a rail conveyor and a rail system comprising a plurality of intersecting rails on which the rail conveyor may travel.

The rail system comprises for example a plurality of rails intersecting at right angles, which may be arranged as pairs of rails intersecting at right angles. Furthermore, the rails are for example designed as round rails with a circular cross-section, arranged approximately flush with the ground. The rail conveyor can travel on the rail system and change its direction of transport at any appropriately configured rail intersection without each rail intersection having to be designed with its own means of rotation.

The invention further comprises a method for operating a rail conveyor element according to the invention, comprising the following steps:
S1: Arrival of the rail conveyor element in the transport position on a first rail at a rail intersection where the first rail intersects with a second rail;
S2: Lowering of the pressure ram onto the rail intersection;
S3: Lifting of the wheel-bearing cassette and the base off the first rail by further lowering of the pressure ram relative to the rail conveyor element;
S4: Rotation of the wheel-bearing cassette from the direction of travel of the first rail to the direction of travel of the second rail;
S5: Lowering of the rail conveyor element onto the second rail by lifting the pressure ram relative to the rail conveyor element;
S6: Resumed travel of the rail conveyor element on the second rail.

The invention further comprises a method for operating a rail conveyor element according to the invention, comprising the following steps:
S1: Arrival of the rail conveyor element in the transport position on a first rail at a rail intersection where the first rail intersects with a second rail;
S2: Lowering of the pressure ram onto the rail intersection;
S3: Lifting of the wheel-bearing cassette off the first rail towards the base;
S4: Rotation of the wheel-bearing cassette from the direction of travel of the first rail to the direction of travel of the second rail;
S5: Lowering of the wheel-bearing cassette onto the second rail;
S6: Lifting of the pressure ram off the rail intersection;
S7: Resumed travel of the rail conveyor element on the second rail.

According to a preferred embodiment of the method according to the invention, the lowering of the pressure ram is initiated during step S1 in such a way that the pressure ram contacts the first rail even before arrival at the rail intersection and brakes the rail conveyor element.

For example, the pressure ram is lowered in such a way that the rail conveyor element is brought to a stop, depending on its weight and speed, by the pressure ram exactly at the rail intersection. For example, the lowering of the pressure ram can be performed for emergency braking of the rail conveyor element along any position of the rail.

BRIEF DESCRIPTION OF THE DRAWINGS

Preferred example embodiments of the present invention will be described in more detail below with reference to the drawings, in which

FIG. 2a-h illustrate a method for rotating a rail conveyor element of the first embodiment of the invention; and FIG. 3a-h illustrate a method for rotating a rail conveyor element of the second embodiment of the invention.

DETAILED DESCRIPTION

Figure 1A:
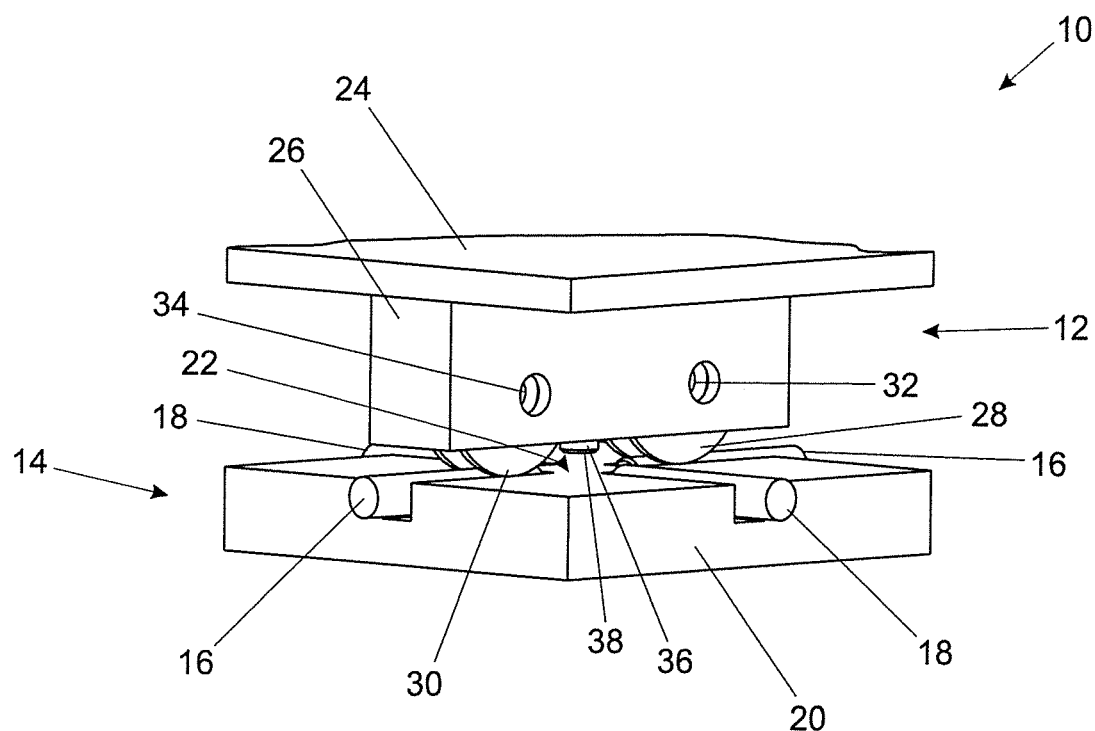
FIG. 1a is a diagrammatic view of a first embodiment of the floor conveyor system according to the invention.

FIG. 1a shows a diagrammatic view of a floor conveyor system 10 comprising a rail conveyor element 12, a rail conveyor not shown in more detail and a rail system 14. The rail conveyor element 12 is arranged so that it can travel on the rail system 14.

Here, the rail system 14 comprises two intersecting rails 16 and 18, which are embedded in a floor element 20 and which protrude above this floor element 20 with their running surfaces. Deviating from this the running surfaces may also be arranged flush with the top of floor element 20. In the intersecting area of the rails 16, 18 the latter are interrupted and form an intersection surface or rail intersection 22. In the embodiment shown, the rails 16 and 18 are disposed at right angles to each other in their running direction, although other angles of intersection are also possible. The rails 16, 18 are designed as round rails with a circular cross-section, which gives them a convex running surface. Naturally, the invention is not limited to this embodiment of the rails.

The rail conveyor element 12 is part of a rail conveyor not shown in its entirety, which may comprise several rail conveyor elements 12. It comprises an only partially shown base 24 which is designed as a flat plate. Base 24 may be specifically designed depending on the requirements of the workpieces or goods to be transported. A wheel-bearing cassette 26 of rail conveyor element 12 is arranged between the bottom of base 24 and the top of rail system 14, i.e. below base 24 in FIG. 1a. Two wheels 28 and 30 are accommodated in this, which partially project out of the bottom open side of wheel-bearing cassette 26, are arranged one behind the other in their running direction and are rotatably mounted by means of their axes 32 and 34 in the upper part of wheel-bearing cassette 26.

The wheels 28 and 30 rest on rail 16 with their running surfaces. Wheels 28, 30 have concave running surfaces which are designed complementary to the running surfaces of rails 16 and 18.

Rail conveyor element 12 further comprises a pressure ram 36, which, starting from the bottom of base 24, extends down in the direction of rail system 14. Pressure ram 36 extends between wheels 28, 30 through wheel-bearing cassette 26 and is disposed in the position shown in such a way that its end pointing towards rail system 14 ends just above the running surface of rails 16, 18. The position shown of pressure ram 36 is equivalent to a lifted unloaded position in which pressure ram 36 is not in contact with either of rails 16, 18 or with rail intersection 22. This coincides with a transport position of rail conveyor element 12 in which the rail conveyor element 12 can travel along rail 16, 18 and wheel-bearing cassette 26 supports the load of base 24. Pressure ram 36 comprises an actuator (not shown here) which is arranged inside wheel-bearing cassette 26. Deviating from the embodiment shown here, the actuator may also be disposed in or on base 24 for example. Pressure ram 36 further comprises a braking surface 38 on its end facing rail system 14.

The wheel-bearing cassette 26 is designed in such a way that, in an unloaded position raised off rails 16, 18, it can rotate relative to base 24 around a vertical rotation axis (see FIG. 2a-2h). Pressure ram 36 is arranged so that its longitudinal axis coincides with the rotation axis of wheel-bearing cassette 26. Pressure ram 36 is designed such that it cannot be rotated so that it does not rotate during rotation of wheel-bearing cassette 26.

Figure 1B:
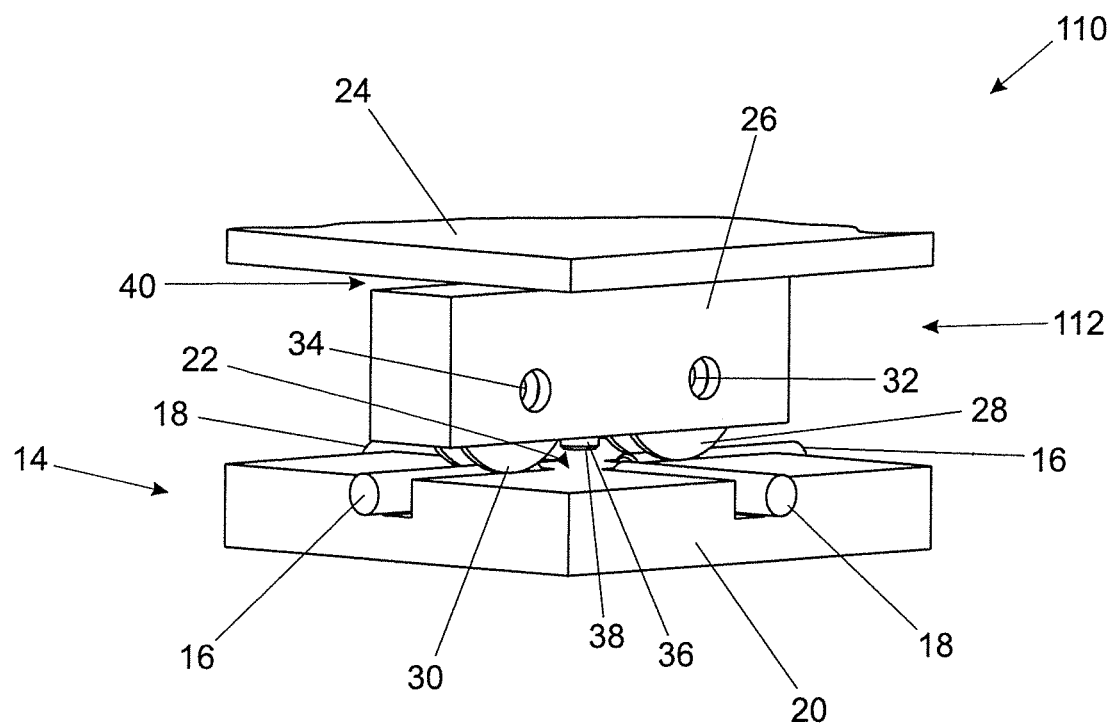
FIG. 1b is a diagrammatic view of a second embodiment of the floor conveyor system according to the invention.

The embodiment of the floor conveyor system 110 shown in FIG. 1b coincides in some elements with the embodiment shown in FIG. 1a. In the transport position of rail conveyor element 112 shown, the base 24 is arranged at a vertical distance 40 from wheel-bearing cassette 26. The wheel-bearing cassette 26 is connected to base 24 by lifting means (not shown here). The lifting means are designed such that they can lift the wheel-bearing cassette 26 relative to base 24, thereby reducing the distance 40 between base 24 and wheel-bearing cassette 26. In a lowered loaded position of pressure ram 36, wheel-bearing cassette 26 can be lifted off rail system 14 or the running surface of rails 16, 18 (see FIG. 3a-h). The lifting means and the wheel-bearing cassette 26 are designed in such a way that the wheel-bearing cassette 26 can be rotated relative to base 24 in the raised position of wheel-bearing cassette 26.

FIG. 2a to 2h shown instants of a rotation of wheel-bearing cassette 26 of the rail conveyor element 12 according to the invention from FIG. 1a, from the running direction of the first rail 16 into the running direction of the second rail 18 and hence a changeover between rails 18, 16 on which rail conveyor element 12 is displaced.

Figure 2A:
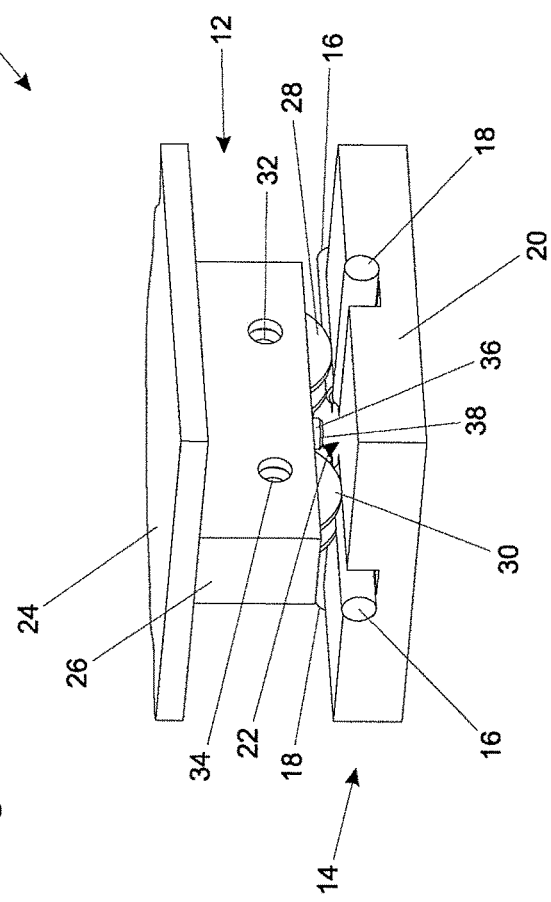

FIG. 2a shows the rail conveyor element 12 in its transport position, in which rail conveyor element 12 is disposed on rail 16 such that both wheels 28, 30 are located in front of rail intersection 22, in FIG. 2a to the left of intersection 22. Such a position coincides with a position in which rail conveyor element 12 can travel along rail 16 and moves towards rail intersection 22.

Figure 2B:
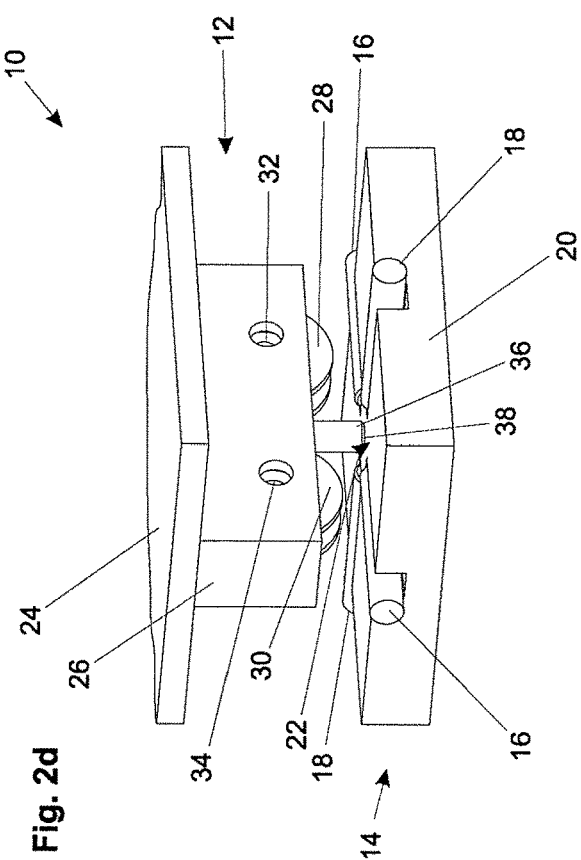

FIG. 2b shows the rail conveyor element 12 in an advanced position of travel above rail intersection 22. The front wheel 28 in the direction of movement is disposed behind rail intersection 22 on rail 16, in FIG. 2a-h this coincides with the right-hand part of rail 16. The following wheel 30 is disposed on the part of rail 16 in front of rail intersection 22 as in FIG. 2a. As in FIG. 1a, the pressure ram 36 is disposed in the middle above rail intersection 22.

Figure 2C:
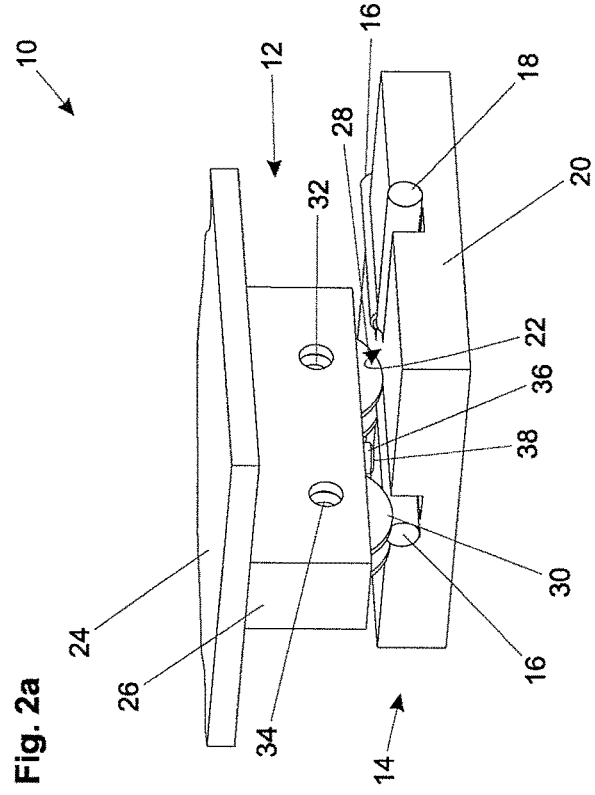

In FIG. 2c, pressure ram 36 is lowered from its raised unloaded position, which coincides with the transport position of rail conveyor element 12, into its loaded position. In this loaded position, braking surface 38 of pressure ram 36 is in contact with the surface of rail intersection 22. Pressure ram 36 may be designed such that its position may be adjusted and its end opposite rail system 14 can move towards rail intersection 22, it may be an appropriately designed hydraulic ram, for example. The loaded position of pressure ram 36 coincides with a position in which pressure ram 36 absorbs the entire load of base 24, wheel-bearing cassette 26 and any workpiece or goods being transported acting on rail system 14. Wheel-bearing cassette 26 is thus relieved of the load of base 24. That means that even during continued contact between the running surfaces of wheels 28, 30 with rail 16, no load is transmitted via wheels 28, 30 to rail 16.

Figure 2D:
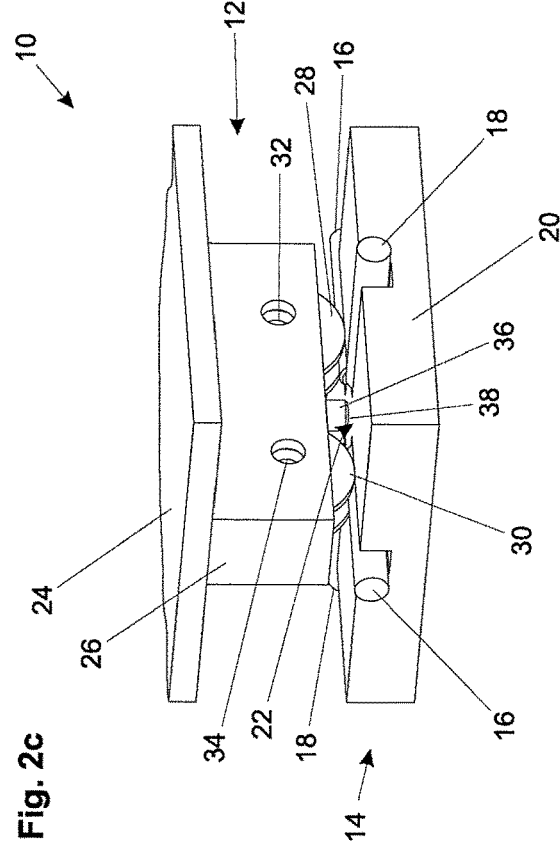

In FIG. 2d, pressure ram 36 is lowered further in such a way that the wheel-bearing cassette 26 and base 24 are entirely lifted off rail system 14 respectively rail 16. Pressure ram 36 lifts base 24 and wheel-bearing cassette 26 off rail 16 in such a way that the wheel-bearing cassette 26 can be freely rotated around its vertical axis of rotation without either of wheels 28, 30 being able to come into contact with rail system 14. The axis of rotation of wheel-bearing cassette 26 coincides with the central longitudinal axis of pressure ram 36.

FIG. 2e shows the wheel-bearing cassette 26 in a position rotated by approximately 45° around its axis of rotation compared to FIG. 2d. Wheel-bearing cassette 26 rotates anti-clockwise. Wheel-bearing cassette 26 rotates around the non-rotating pressure ram 36, with the rotation process being able to be performed with a substantially reduced force. Accompanying rotation of the pressure ram 36 would create a high friction force between braking surface 38 of pressure ram 36 and rail intersection 22 due to the mass acting on it. This in turn requires an increased rotation force to rotate wheel-bearing cassette 26 and pressure ram 36. Wheel-bearing cassette 26 rotates relative to base 24 which is also non-rotating and retains its spatial orientation. The rotation of wheel-bearing cassette 26 relative to base 24 can be accomplished by means of a suitable pivot bearing between both parts 24, 26.

FIG. 2f shows the wheel-bearing cassette 26 in a position rotated by approximately 20° further compared to FIG. 2e.

FIG. 2g shows the wheel-bearing cassette in a position rotated by 90° compared to FIG. 2d. The wheel-bearing cassette 26 is arranged such that its wheels 28, 30 are oriented with their running direction in the running direction of rail 18. Wheel 28 is disposed above the part of rail 18 on the left in FIG. 2g and wheel 30 above the part of rail 18 on the right in FIG. 2g. Hence the wheel-bearing cassette 26 has been rotated in FIG. 2a to 2d from a running direction of rail 16 to a running direction of rail 18.

In FIG. 2h, the rail conveyor element 12 has been lowered from the position shown in FIG. 2g into its transport position in which the wheel-bearing cassette 26 has been lowered onto rail system 14 or rail 18 such that its wheels 28, 30 are in contact with rail 18 supporting the load of rail conveyor element 12 and this latter can be displaced along rail 18. This transport position is reached by lifting pressure ram 36 off rail intersection 22 causing base 24 and wheel-bearing cassette 26 to be lowered until wheel-bearing cassette 26 again supports the load of base 24. Pressure ram 36 is moved further into its lifted unloaded position in which it cannot come into contact with rail system 14.

By means of the rotation movements shown in FIG. 2a to 2h of rail conveyor element 12 on rail system 14, the transport direction of the rail conveyor element 12 can be rotated from a first running direction of rail 16 to a second running direction of rail 18. As this happens, the spatial orientation of base 24 and any workpiece or goods disposed on it remains the same. A rail conveyor comprising several rail conveyor elements 12 comprises, for example, four rail conveyor elements 12 which have a common rectangular base 24 and can each be displaced along a rail. By synchronous performance of the movement of rail conveyor elements 12 illustrated in FIG. 2a to 2h, the rail conveyor can be moved from a transport direction coinciding with the running direction of a first pair of rails into a transport direction coinciding with the running direction of a second pair of rails.

Figure 3A:
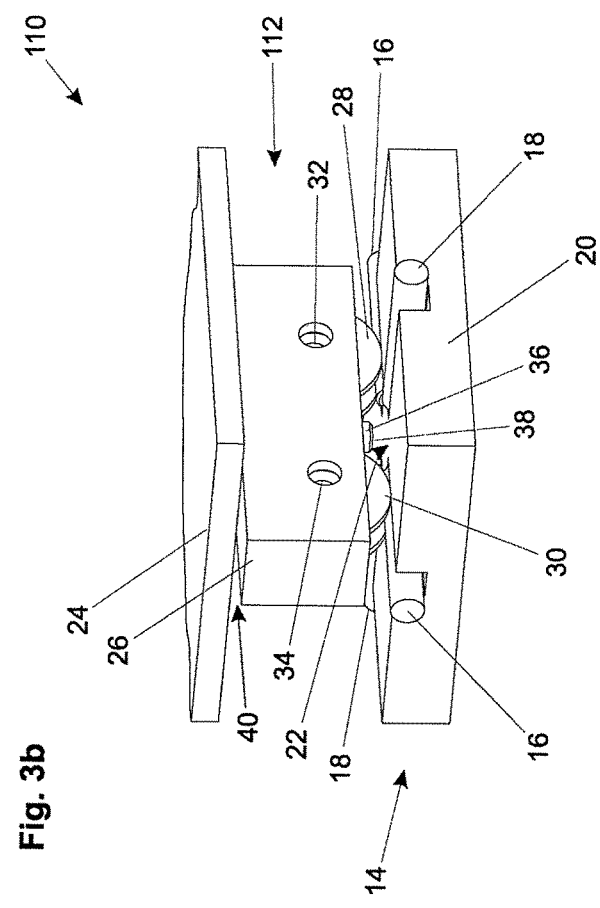
Figure 3B:
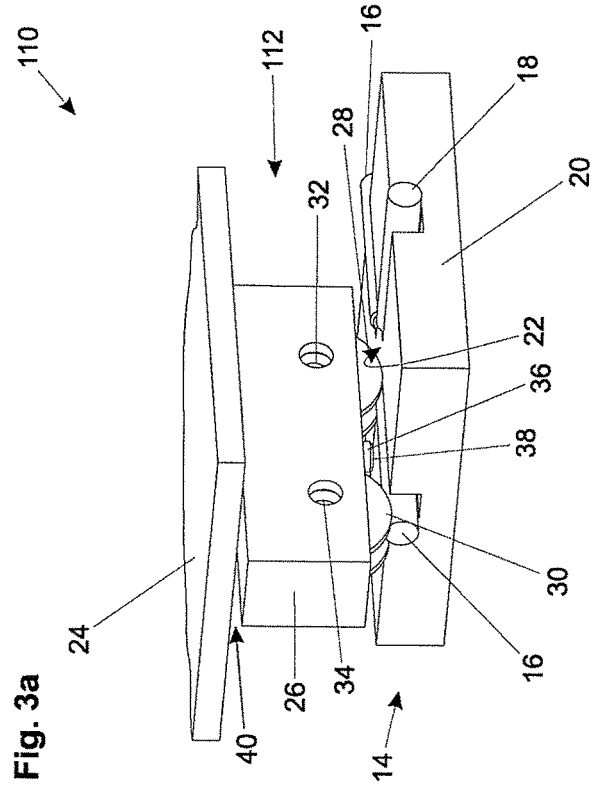
Figure 3C:
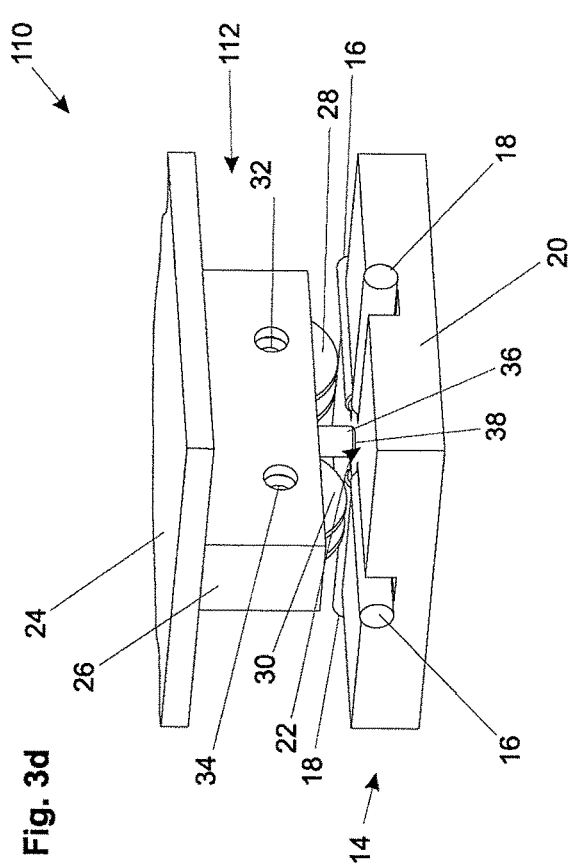

FIG. 3a to 3h show the method for rotating a rail conveyor element 112 according to the embodiment shown in FIG. 1b. The position of rail conveyor element 112 on the rail system 14 coincides with the arrangements shown in FIG. 2a to 2h. The movement shown in FIG. 3a to 3c is identical to the movement shown in FIG. 2a to 2c. The rail conveyor element 112 is in its transport position on rail 16 and enters a rail intersection 22. The transport position coincides with the position shown in FIG. 1b, in which wheel-bearing cassette 26 is disposed at a distance 40 to base 24. As shown in FIG. 2c, in FIG. 3c the pressure ram 36 is lowered onto rail intersection 22 in such a way that it absorbs the load of wheel-bearing cassette 26 and base 24.

Figure 3D:
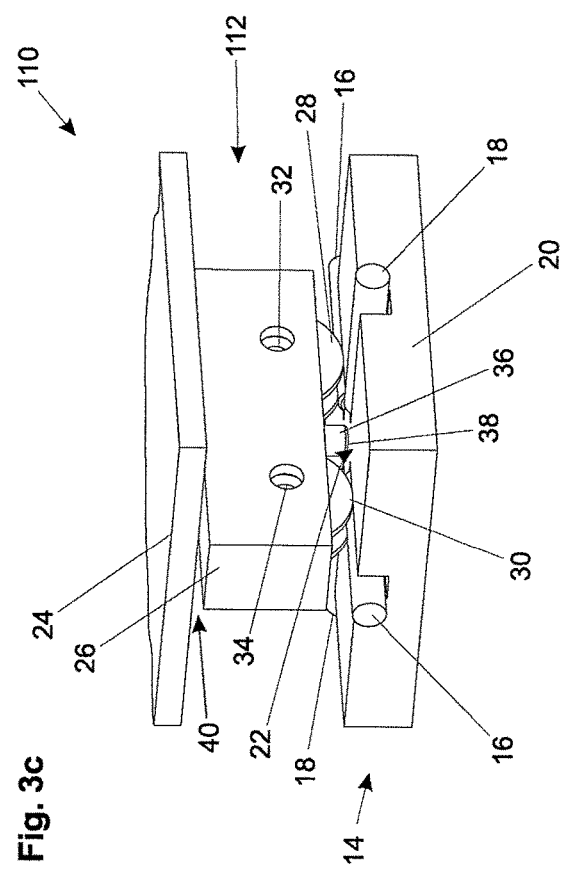

In FIG. 3d the pressure ram 36 is not further lowered but not—as in FIG. 2d—to lift wheel-bearing cassette 26 and base 24 off the rail system 14 together, but rather the wheel-bearing cassette 26 is lifted towards base 24 by means of lifting means not shown here, causing the distance 40 between wheel-bearing cassette 26 and base 24 to be reduced, while base 24 retains its height above rail system 14. The wheel-bearing cassette 26 is lifted by the lifting means in such a way that it can be freely rotated around its axis of rotation above rail system 14 relative to base 24 without either of its wheels 28, 30 being able to come into contact with either of rails 16, 18.

The movements of rail conveyor element 112 shown in FIG. 3e to 3g coincide with the movements of the rail conveyor element 12 shown in FIG. 2e to 2g. The wheel-bearing cassette 26 lifted here towards base 24 is rotated around its axis of rotation by a total of 90° relative to base 24 so that the running direction of wheels 28, 30 is positioned according to the running position of second rail 18. For further details of this movement the reader is referred to the description accompanying FIG. 2e to 2g.

FIG. 3h shows the rail conveyor element 112 in its transport position on rail 18. For that the wheel-bearing cassette 26 is lowered onto rail 18 by the lifting means in such a way that the running surfaces of wheels 28, 30 rest on rail 18 and the wheel-bearing cassette 26 supports the load of base 24 and any workpiece disposed on it. The distance 40 between base 24 and wheel-bearing cassette 26 increases again. The pressure ram 36 is then lifted in such a way that the rail conveyor element 112 can be moved on rail 18 without pressure ram 36 coming into contact with rail 18.

In each of the embodiments shown, pressure ram 36 can be lowered during entry of the rail conveyor element 12, 112 into rail intersection 22 in such a way that its braking surface 38 rests on the surface of rail 16 or 18 and friction is caused between braking surface 38 and the surface. This friction can brake the rail conveyor element 12, 112 in such a way that it comes to a standstill in a certain position, this position preferably coinciding with the rotation position of the rail conveyor element 12, 112 on rail intersection 22.

Naturally, it is possible to combine the designs of rail conveyor elements 12 and 112 in such a way that a lifting of wheel-bearing cassette 26 and base 24 off rail 16, 18 and a lifting of wheel-bearing cassette 26 towards base 24 by lifting means are rendered possible by a third embodiment of the invention. Thus an appropriately designed rail conveyor element can perform the movement shown in FIG. 2a-h or FIG. 3a-h, or a combination of these two movements.

The invention claimed is:
1. A rail conveyor element which is adapted to be displaced on a rail system with intersecting rails comprising:
   a base,
   a wheel-bearing cassette having the base mounted thereon, and which, in a transport position of the rail conveyor element supports the base,
   at least one wheel in the wheel-bearing cassette and accommodated to rest on a said rail and
   a pressure ram with actuator which extends downward on or below said wheel-bearing cassette and is adapted to be moved by an actuator between a raised unloaded position which coincides with the transport position of the rail conveyor element and a lowered loaded position for unloading the wheel-bearing cassette relative to a said rail, wherein the wheel-bearing cassette is mounted to be rotatable around a vertical axis relative to the base, wherein the pressure ram is designed, in its loaded position, to lift the wheel-bearing cassette together with the base off the rails.

2. A rail conveyor element according to claim 1, wherein the wheel-bearing cassette in the transport position is arranged at a vertical distance relative to the base and the rail conveyor element further comprises a lifting device designed to lift the unloaded wheel-bearing cassette towards the base in the loaded position of the pressure ram.

3. A rail conveyor element according to claim 1, wherein at least two wheels are accommodated in the wheel-bearing cassette, between which the pressure ram is disposed.

4. A rail conveyor element according to claim 1, wherein the longitudinal axis of the pressure ram is identical to an axis of rotation of the wheel-bearing cassette.

5. A rail conveyor element according to claim 1, wherein the pressure ram is non-rotatably disposed relative to the wheel-bearing cassette.

6. A rail conveyor element according to claim 1, wherein the actuator is disposed in the wheel-bearing cassette.

7. A rail conveyor element according to claim 1, wherein the actuator is disposed in or on the base.

8. A rail conveyor element according to claim 1, wherein the pressure ram comprises at least one braking surface at an end thereof which can be displaced towards the rails.

9. A rail conveyor comprising a plurality of rail conveyor elements according to claim 1, which have a common base and are synchronized by synchronizing devices to perform a common rotation of their wheel-bearing cassettes.

10. A rail conveyor according to claim 9, wherein the plurality of rail conveyor elements are further synchronized to perform a common movement of their pressure rams.

11. A floor conveyor system comprising a rail conveyor according to claim 9 and a rail system comprising a plurality of intersecting rails on which the rail conveyor is adapted to be displaced.

12. A method for operating a rail conveyor element which is adapted to be displaced on a rail system with intersecting rails, the rail system comprising a base, a wheel-bearing cassette having the base mounted thereon, and which, in a transport position of the rail conveyor element supports the base, at least one wheel in the wheel-bearing cassette and accommodated to rest on a said rail and a pressure ram with actuator which extends downward on or below said wheel-bearing cassette and is adapted to be moved by an actuator between a raised unloaded position which coincides with the transport position of the rail conveyor element and a lowered loaded position for unloading the wheel-bearing cassette relative to a said rail, wherein the wheel-bearing cassette is mounted to be rotatable around a vertical axis relative to the base, said method comprising the following steps:
S1: positioning of the rail conveyor element in the transport position on a first said rail at a rail intersection where the first rail intersects with a second rail;
S2: lowering of the pressure ram onto the rail intersection;
S3: lifting of the wheel-bearing cassette and the base off the first rail by further lowering of the pressure ram relative to the rail conveyor element;
S4: rotation of the wheel-bearing cassette from the direction of travel of the first rail to the direction of travel of the second rail;
S5: lowering of the rail conveyor element onto the second rail by lifting the pressure ram relative to the rail conveyor element;
S6: resuming travel of the rail conveyor element on the second rail.

13. A method according to claim 12, wherein lowering of the pressure ram is initiated during step S1 in such a way that the pressure ram contacts the first rail before reaching the rail intersection and brakes the rail conveyor element.

14. A method for operating a rail conveyor element which is adapted to be displaced on a rail system with intersecting rails, the rail system comprising a base, a wheel-bearing cassette having the base mounted thereon, and which, in a transport position of the rail conveyor element supports the base, at least one wheel in the wheel-bearing cassette and accommodated to rest on a said rail and a pressure ram with actuator which extends downward on or below said wheel-bearing cassette and is adapted to be moved by an actuator between a raised unloaded position which coincides with the transport position of the rail conveyor element and a lowered loaded position for unloading the wheel-bearing cassette relative to a said rail, wherein the wheel-bearing cassette is mounted to be rotatable around a vertical axis relative to the base, said method comprising the following steps:
S1: positioning of the rail conveyor element in the transport position on a first said rail at a rail intersection where the first rail intersects with a second rail;
S2: lowering of the pressure ram onto the rail intersection;
S3: lifting of the wheel-bearing cassette off the first rail towards the base without moving the base relative to the rail system;
S4: rotation of the wheel-bearing cassette from the direction of travel of the first rail to the direction of travel of the second rail;
S5: lowering of the wheel-bearing cassette onto the second rail;
S6: lifting of the pressure ram off the rail intersection;
S7: resuming travel of the rail conveyor element on the second rail.

15. A method according to claim 14, wherein lowering of the pressure ram is initiated during step S1 in such a way that the pressure ram contacts the first rail before reaching the rail intersection and brakes the rail conveyor element.

* * * * *